United States Patent
Saito et al.

[15] 3,694,610
[45] Sept. 26, 1972

[54] PROCESS FOR PREPARING A METAL MOLD BY ELECTRICAL MACHINING

[72] Inventors: Nagao Saito, Nagoya; Kazushige Koike, Kasugai, both of Japan

[73] Assignee: Mitsubishi Denki Kabushiki Kaisha, Tokyo, Japan

[22] Filed: Dec. 6, 1971

[21] Appl. No.: 205,135

[30] Foreign Application Priority Data

March 29, 1971 Japan ..................... 46/18532
Dec. 12, 1970 Japan ................... 45/110751

[52] U.S. Cl. ........... 219/69 M, 204/143 M, 219/69 E
[51] Int. Cl. ........................... B23p 1/08, B23p 1/04
[58] Field of Search ................. 204/143 M; 219/69 M

[56] References Cited

UNITED STATES PATENTS 2,924,701  2/1960  Stamper ................... 219/69 M
2,927,190  3/1960  Dulebohn et al. ........ 219/69 M

*Primary Examiner*—R. F. Staubly
*Attorney*—Norman F. Oblon et al.

[57] ABSTRACT

A metal mold is prepared by an electrical machining process wherein one of a base metal mold and an upper metal mold is electrically shaped by using an electrode having a desired shape on a surface thereof facing the workpiece, and the electrode then is fitted into the shaped metal mold to make a composite electrode of the two, and if necessary, the opposite surface of the electrode is also shaped. The other metal mold is then electrically shaped by using the composite electrode having the desired shape. With this invention, it is possible to provide a metal mold for thin articles, such as plastic articles.

8 Claims, 8 Drawing Figures

PATENTED SEP 26 1972

3,694,610

INVENTORS
NAGAO SAITO
KAZUSHIGE KOIKE

BY Oblon, Fisher and Spivak
ATTORNEYS

PROCESS FOR PREPARING A METAL MOLD BY ELECTRICAL MACHINING

BACKGROUND OF THE INVENTION

1. Field of the Invention

This invention relates to a process for preparing a metal mold by electrical machining.

2. Prior Art

It is well known that metal molds used for various molding practices may be made by engraving a surface of the metal mold, either by hand or with an engraving machine, and then grinding or buffing the engraved surface so that a fine shaped molded article may be produced therewith. However, this is a comprehensive operation and such conventional shaping processes take a relatively long period of time. In order to overcome these difficulties, it has been proposed that such metal molds be produced by electrical machining processes, such as an electric discharging process or an electrolytical etching process. However, in the conventional electrical machining process, it has been difficult to satisfactorily correspond the engraved shapes of the upper metal mold and the base metal mold and the parting line therebetween, because the upper metal mold and the base metal mold are separately prepared.

SUMMARY OF THE INVENTION

Accordingly, it is an object of the present invention to provide an improved process for preparing a metal mold by electrical machining, such as by an electric discharging process or an electrolytical etching process, to produce a metal mold wherein the shapes of a first metal mold half and a second metal mold half and the parting line therebetween are completely matching.

The foregoing object and described advantages of this invention can be attained according to one aspect of this invention by a process for preparing a metal mold which comprises the steps of electrically machining a first metal mold by using an electrode having a desired shape, then fitting the electrode into the machined portion of the first metal mold, and further electrically machining the second metal mold by using the composite electrode formed by fitting the electrode into the first metal mold.

BRIEF DESCRIPTION OF THE DRAWINGS

Various other objects, features and attendant advantages of the present invention will be more fully appreciated as the same becomes better understood by reference to the following detailed description, when considered in connection with the accompanying drawings, wherein like reference numerals designate like or corresponding parts throughout the several illustrations, and in which.

DESCRIPTION OF THE ILLUSTRATED EMBODIMENTS

Figure 1:
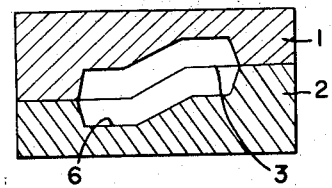
FIG. 1 is a sectional view of a metal mold prepared in accordance with the method of this invention.
Figure 2:
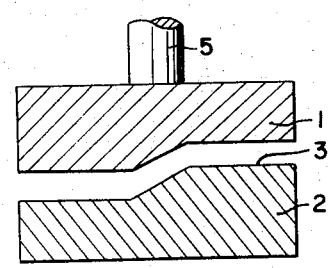
FIGS. 2 – 4 are respectively sectional views showing the metal mold of FIG. 1 being prepared according to one embodiment of this invention.
Figure 3:
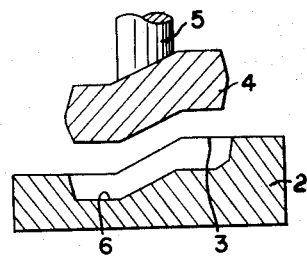
Figure 4:
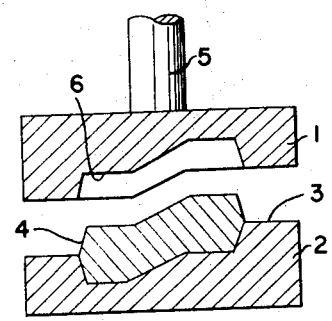

Referring now to the drawings, and especially to FIGS. 1 – 4 thereof, a first metal mold half, such as, for example, an upper metal mold, or one which essentially is normally disposed with the cavity thereof facing downwardly, is designated by the reference numeral 1, while the reference numeral 2 designates a second metal mold half, being a base metal mold, for example, or one which is generally disposed with the cavity thereof opening upwardly. A parting line, or one which follows the contour of the mating surfaces of the upper metal mold 1 and the lower, or base, metal mold 2, is designated by the reference numeral 3. In FIGS. 3 and 4, respectively, an electrode 4 having a desired shape is shown first being movably supported by a holder 5 for forming a cavity or gap 6 of predetermined configuration in the metal mold 2, and then being partially disposed in the gap 6 of the metal mold 2 while the upper metal mold is movably supported by the holder 5 to be shaped by the electrode. The steps by which preparation of the metal mold takes place are now described, referring to FIGS. 2 – 4 for illustration.

In the first step, shown in FIG. 2, the upper metal mold 1 is fixed to the holder 5 with a suitable binder and is connected to an apparatus for performing an electric discharge-shaping process. The base metal mold 2 being the workpiece, is then shaped by a conventional electric discharging practice, with the upper metal mold 1 serving as the electrode to form a parting line 3. In this step, the parting lines 3 formed between the upper metal mold 1 and the base metal mold 2 completely correspond with each other.

In the second step, shown in FIG. 3, an electrode 4 having a desired shape is now fixed to the holder 5 with a suitable binder and the base metal mold 2, still being the workpiece, is shaped by the same electric discharging process practiced in the first step to form a working gap 6 therein. Where it is difficult to fix the electrode 4 to the holder 5 in this step because of its shape, the electrode 4 is bonded to the holder 5 by using an alloy having a low melting point. After the second step operation is performed, the electrode 4 is separated from the holder 5, such as, for example, by heating the low melting-point alloy.

In the third step, shown in FIG. 4, the electrode 4 is still fitted in the base metal mold 2 shaped in the second step, and is bonded with a binder. On the other hand, the upper metal mold 1 is now fixed to the holder 5 and the upper metal mold 1, now being the workpiece, is shaped by the conventional electric discharging process with the electrode 4. This process is continued until the parting line 3 is shaped. The binder used should be electrically conductive and easily removable, so that after shaping, the molds are left without any remaining traces thereof.

One example of a suitable binder is an acrylic type binder to provide immediate bonding, under pressure, wherein the binder is partially bonded by pressing to produce contact between the metal surfaces.

Another example is to form a partial gap between the electrode 4 and the base metal mold 2 and to bond them by putting a binder in the gap 6.

To effect separation of the electrode 4 from the base metal mold 2 after the third step, the following methods can be employed. First, the electrode 4 or the base metal mold 2 may be impacted. Other methods include removing the electrode 4 by connecting a bolt on it, heating the base metal mold 2 and the electrode 4 to cause separation by the difference of thermal expansions, and dissolving the binder with a solvent. Although a primary object of this invention can be attained in accordance with this process, certain problems do arise, such as, the need for an electrode of a particular shape, and the fact that the electrode may be easily broken or deformed in the preparation of the electrode, or the second step, when the thickness of the electrode is quite thin, such as 0.5 mm – 1.0 mm, in the case of molding plastics.

In the embodiment illustrated in FIGS. 5 – 8, for carrying out an electric discharging process to shape the molds, the same basic elements are present, namely, an upper metal mold 1 and a base metal mold 2 having a parting line 3 formed therebetween, and an electrode 4 formed of graphite, copper, or the like, carried by a movable holder 5 for providing a working gap 6 in the metal molds. The movable electrode 4 in this case is shaped according to a predetermined configuration only on the surface 7 thereof facing the workpiece, with the other surface areas 8 thereof having optional forms, as may be desired.

Figure 5:
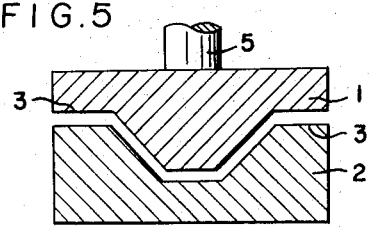
FIGS. 5 – 8 are respectively sectional views showing a metal mold of another configuration being prepared according to another embodiment of the present invention.

In the first step, the upper metal mold 1 is fixed to the holder 5 with a suitable binder and is connected to an apparatus in a conventional manner for electric discharge-shaping of a workpiece. The base metal mold 2 being the workpiece, is then shaped by an electric discharging process, using the upper metal mold 1 as the working electrode, as shown in FIG. 5. In this step, the parting lines 3 between the upper metal mold 1 and the base metal mold 2 thereby completely correspond with each other.

Figure 6:
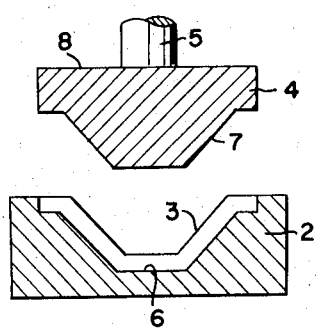

Next, the electrode 4 having the desired shape only on the surface 7 thereof opposing a workpiece is fixed to the holder 5 with the binder and, as shown in FIG. 6, the base metal mold 2 is shaped, as a workpiece, by the same electric discharging process in accordance with the first step, to form a gap 6 therein. Where the form of the electrode 4 is such that it is difficult to fix the same to the holder 5, in this step, the electrode 4 is preferably bonded to the holder 5 by using an alloy having a low melting point. After the second step operation has been completed, the electrode 4 may be separated from the holder 5 by heating the low melting-point alloy.

Figure 7:
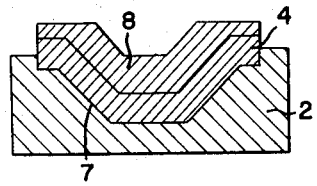

In the following step, shown in FIG. 7, the separated electrode 4 is fitted within the gap 6 shaped within the base metal mold 2 and fixed therein with the binder. A desired part 8 of the surface of the electrode 4 opposite the surface fixed within the base metal mold 2 is removed by shaving, grinding or by another suitable method. Accordingly, it is possible to prepare an electrode having a desired shape of such thickness as between 0.5 mm – 1.0 mm, without any damage or deformation.

Figure 8:
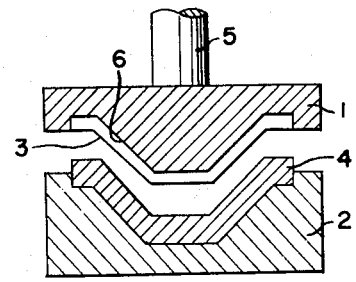

In the fourth step, shown in FIG. 8, the composite structure of the base metal mold 2 and the electrode 4 shaped in the third step is used as an electrode for shaping the upper metal mold 1 by the conventional electric discharging process until the parting line 3 is formed. After this electric discharge shaping process is complete, the electrode 4 is removed.

In accordance with the methods just described, the electrode is separated from the base metal mold. Although in these examples, only the application of an electric discharge shaping process is illustrated, it is to be understood that similar results can be obtained by instead applying a conventional electrolytical etching process. Examples of conventional electrolytical etching processes are stated in U. S. Pat. No. 3,058,895.

As stated above, in accordance with the process of this invention, a first metal mold half is electrically shaped by using an electrode having a desired shape and the electrode is then fitted therein, and a second metal mold half is then electrically shaped by using the composite structure of the electrode and the first metal mold half as an electrode, whereby the shapes of the first metal metal mold and the second metal mold and the parting line can be completely corresponded to each other, respectively.

Moreover, since the parting line between the first metal mold half and the second metal mold half is formed in the first step, the base surface is formed. Accordingly, in the second step, the shaping depth is accurate whereby a metal mold having high accuracy can be prepared with great coefficiency. The advantage is especially remarkable for preparing a metal mold having a comprehensive parting line, although the advantage is also remarkable for preparing metal molds having simple parting lines.

Obviously many modifications and variations of the present invention are possible in light of the above teachings. It is to be understood, therefore, that within the scope of the appended claims, the invention may be practiced otherwise than as specially described herein.

What is claimed as new and desired to be secured by Letters Patent of the United States is:

1. A process for preparing a metal mold which comprises the steps of:
   electrically machining one of a first metal mold half and a second metal mold half using an electrode having a preselected shape; and
   further electrically machining the other of said first and second metal mold halves using an electrode compositely formed of said one of said first and second metal mold halves and said electrode of preselected shape being fitted within said one of said first and second metal mold halves.

2. A process for preparing a metal mold according to claim 1, which further comprises:
   first electrically machining one of said first and second metal mold halves using the other of said first and second metal mold halves as an electrode.

3. A process for preparing a metal mold according to claim 2, wherein said electrode is fixed to a holder with an alloy having a low melting point.

4. A process for preparing a metal mold according to claim 1, in which said electrode has a preselected shape on at least one surface thereof; and further comprising:
   electrically machining the opposite surface of said electrode while being fitted within said one of said first and second metal mold halves and before electrically machining said other of said first and second metal mold halves with said composite electrode; and separating said electrode from said one of said first and second mold halves.

5. A process for preparing a metal mold according to claim 4, wherein said electrode is fixed to a holder with an alloy having a low melting point.

6. A process for preparing a metal mold according to claim 4, wherein said electrode is fixed to said one of said first and second metal mold halves with an acrylic type binder for immediate bonding.

7. A process for preparing a metal mold according to claim 1, wherein said electrode is fixed to a holder with an alloy having a low melting point.

8. A process for preparing a metal mold according to claim 1, wherein said electrode is fixed to said one of said first and second metal mold halves with an acrylic type binder for immediate bonding.

* * * * *